(12) United States Patent
Van Der Vleuten

(10) Patent No.: US 9,230,509 B2
(45) Date of Patent: Jan. 5, 2016

(54) LUMINANCE CHANGING IMAGE PROCESSING WITH COLOR CONSTRAINTS

(71) Applicant: KONINKLIJKE PHILIPS N.V., Eindhoven (NL)

(72) Inventor: Renatus Josephus Van Der Vleuten, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/402,135

(22) PCT Filed: Sep. 17, 2013

(86) PCT No.: PCT/EP2013/069203
§ 371 (c)(1),
(2) Date: Nov. 19, 2014

(87) PCT Pub. No.: WO2014/056679
PCT Pub. Date: Apr. 17, 2014

(65) Prior Publication Data
US 2015/0221280 A1 Aug. 6, 2015

(30) Foreign Application Priority Data

Oct. 8, 2012 (EP) ..................................... 12187572

(51) Int. Cl.
*G06K 9/00* (2006.01)
*G09G 5/02* (2006.01)
(Continued)

(52) U.S. Cl.
CPC ............... *G09G 5/02* (2013.01); *G06T 3/0056* (2013.01); *G06T 5/002* (2013.01); *H04N 1/6027* (2013.01)

(58) Field of Classification Search
CPC ....... G06T 5/001; H04N 9/045; H04N 1/6027
USPC ..................................... 382/167; 345/88, 102
See application file for complete search history.

(56) References Cited

U.S. PATENT DOCUMENTS 5,450,216 A * 9/1995 Kasson .......................... 358/518
6,677,959 B1 1/2004 James
(Continued)

FOREIGN PATENT DOCUMENTS

EP 1326433 A2 7/2003
EP 1397008 A2 3/2004
(Continued)

OTHER PUBLICATIONS

"Color Correction for Tone Mapping" R. Mantiuk et al, Europgraphics vol. 28, (2009) pp. 193-202.
(Continued)

*Primary Examiner* — Ruiping Li

(57) ABSTRACT

To be able to do good color mapping between color encodings for gamuts with considerably different luminance dynamic range while not introducing significant color errors, we describe an image color processing apparatus (201) arranged to transform an input color (L,x,y) of a pixel specified in a color representation corresponding to a first luminance dynamic range into an output color (L*,x,y) of a pixel specified in a color representation corresponding to a second luminance dynamic range, which first and second dynamic ranges differ in extent by at least a multiplicative factor 1.5, comprising a tone mapping deformation unit (203) arranged to determine on the basis of an input tone mapping (301) and a quantity linearly related to the luminance (L) of the input color, an adjusted output luminance (L*, 309), wherein the determining is arranged so that the adjusted output luminance (L*, 309) obtained by applying the input tone mapping to the input luminance (L) of all possible input luminances in its extent of valid values [0,1] giving the highest output (L*, L_HDR), is not higher than a maximum luminance Lmax(x, y) which for the chromatic coordinates (x,y) of the input color is maximally achievable in the gamut corresponding to the second luminance dynamic range for those chromatic coordinates (x,y).

20 Claims, 6 Drawing Sheets

(51) Int. Cl.
   *H04N 1/60*   (2006.01)
   *G06T 3/00*   (2006.01)
   *G06T 5/00*   (2006.01)

(56) References Cited

U.S. PATENT DOCUMENTS

| | | | |
|---|---|---|---|
| 6,862,012 B1* | 3/2005 | Funakoshi et al. | 345/88 |
| 2005/0231457 A1* | 10/2005 | Yamamoto et al. | 345/102 |
| 2006/0104508 A1 | 5/2006 | Daly et al. | |
| 2007/0222728 A1 | 9/2007 | Koyama et al. | |

FOREIGN PATENT DOCUMENTS

| | | |
|---|---|---|
| EP | 1566958 A2 | 8/2005 |
| WO | 2008136629 A1 | 11/2008 |

OTHER PUBLICATIONS

"Color Management" Wikipedia, Sep. 14, 2012.
"Gamut" Wikipedia, Sep. 14, 2012.
"Rec. 709" Wikipedia, Sep. 14, 2012.
"SRGB" Wikipedia, Sep. 14, 2012.
"CIE 1931 Color Space" Wikipedia, Sep. 14, 2012.
"A GPU Friendly Method for High Dynamic Range Texture Compression.." Banterle et al, Grapics Interface 2008, Ontario, CA, p. 28-30—May 2008.
"Tone Reproduction and Color Appearance Modeling.." Reinhard, Imaging.Org.
"Color Grading" Wikipedia, Sep. 14, 2012.
"Tone Mapping" Wikipedia, Sep. 14, 2012.
Color Correction Handbook. Alexis Van Hurkman, Chapter Y'CBCR Luma Adjustments VS. RGG Luma Adjustments, 2011.

* cited by examiner

LUMINANCE CHANGING IMAGE PROCESSING WITH COLOR CONSTRAINTS

CROSS-REFERENCE TO PRIOR APPLICATIONS

This application is the U.S. National Phase application under 35 U.S.C. §371 of International Application No. PCT/EP2013/069203, filed on Sep. 17, 2013, which claims the benefit of EU Patent Application No. EP12187572, filed on Oct. 8, 2012. These applications are hereby incorporated by reference herein.

FIELD OF THE INVENTION

The invention relates to apparatuses and methods and resulting products like data storage or transmission products or signals, for converting an image with pixel colors with first luminances into an image with pixel colors with second luminances.

BACKGROUND OF THE INVENTION

Color processing is a difficult task, especially when transforming (such as e.g. to obtain a color specification directly usable for driving a display, whereby the display can take care of handling its specifics, like e.g. a display dependent electro-optical rendering behavior or gamma) colors between color representations corresponding to an input and output luminance dynamic range which differ considerably, e.g. the largest one is at least 1.5 times larger than the smaller one. This can happen e.g. when transforming from High dynamic range (HDR) to Low dynamic range (LDR), or vice versa. HDR may refer to rendering on a display with higher peak brightness, and typically also deeper blacks, but also signal encoding with a higher captured scene dynamic range, or to be used with such a higher dynamic range display. The skilled reader understands if we say the representation corresponds to a particular dynamic range, that it is specified according to that range. A color specification means not so much (especially in the technical field of HDR encoding or HDR rendering) unless we specify which luminances correspond to the color coordinates (e.g. should one show a photo of a tapestry with the maximum brightness, or with a reduced brightness so that it looks more like a tapestry and less like a luminous object). E.g., in a relative RGB encoding, we may say that the white [1,1,1] corresponds with a maximum displayable peak brightness of 2000 nit (for a HDR display), and e.g. 2× less for an other ("LDR") display for which we will derive a new color specification. If the color is specified device dependently, the maximum of the dynamic range may be the actual display peak brightness, and for generic color encodings, one can consider the maximum encoding (e.g. 255,255,255) corresponding with a reference display peak brightness (e.g. 5000 nit). This principle can be applied in whatever way one encodes the color (e.g. in non-linear Lab, etc.).

Now prior art attempts to map from e.g. HDR to LDR have seen considerable difficulties in obtaining good (e.g. natural looking, or with the output/LDR colors reasonably matching the input HDR/colors at least in their chromatic appearance not their brightness or lightness) colors as output. At least three reasons contribute to this. Firstly, several color spaces used in practice are non-linear in an inconvenient way, and even then people don't always use them in the correct way, which leads to (sometimes difficult to predict) color errors, which then need considerable further correction. Secondly, different displays have their own inherent limitations, and an LDR display just cannot make as many bright colors as an HDR display. This may e.g. lead to choices in the top of the LDR gamut to make colors less saturated. Lastly, ultimately the quality of the colors is judged by the appearances to the human viewer, and this is also a highly complex process. A big mathematical issue when inappropriately mapping colors is already the clipping which occurs when mapping colors to non-realizable, out-of-gamut colors for the final display and/or output color space.

An example of a system which adapts an image for displaying on a display with a different dynamic range is provided in US2006/0104508. In the system, specular highlights are detected in an LDR image and the additional dynamic range of an HDR display is used to increase the brightness of the specular highlight. The system achieves this by applying a piecewise linear transformation.

Prior art like R. Mantiuk et al. "Color Correction for Tone Mapping," Eurographics Vol. 28 (2009), pp. 193-202, start by specifying a tone mapping in the luminance direction, and then apply this tone mapping on the luminances of the pixels in the input image. The then remaining color problems are handled, but it is still difficult to get good colors.

An object of our invention is to also have a color processing which can handle inter alia the mapping between a color representation for a higher and lower luminance dynamic range, which takes particular care of handling the chromatic appearance of the colors correctly. And preferably also we have a simple method, which can cheaply be incorporated in many apparatuses.

SUMMARY OF THE INVENTION

The object is realized by an image color processing apparatus (201) arranged to transform an input color (L,x,y) of a pixel specified in a color representation corresponding to a first luminance dynamic range into an output color (L*,x,y) of a pixel specified in a color representation corresponding to a second luminance dynamic range, which first and second dynamic ranges differ in extent by at least a multiplicative factor of 1.5, comprising: a tone mapping deformation unit (203) arranged to determine an adjusted output luminance (L*, 309) for the output color from an input luminance (L) of the input color and on the basis of an input tone mapping (301) and a quantity linearly related to the input luminance (L), the quantity being indicative of a maximum luminance which for the chromatic coordinates (x,y) of the input color is maximally achievable in at least one of a gamut corresponding to the first luminance dynamic range and a gamut corresponding to the second luminance dynamic range for those chromatic coordinates (x,y); wherein the tone mapping deformation unit is arranged to generate the adjusted output luminance by applying an adjusted tone mapping to the input luminance; and the tone mapping deformation unit (203) is arranged to determine the adjusted tone mapping by adapting the input tone mapping dependent on the quantity so that any adjusted output luminance (L*, 309) obtained by applying the adjusted tone mapping to any input luminance (L) of all possible input luminances in its extent of valid values [0,1] is not higher than a maximum luminance Lmax(x,y) which for the chromatic coordinates (x,y) of the input color is maximally achievable in the gamut corresponding to the second luminance dynamic range for those chromatic coordinates (x,y).

Prima facie this may appear related to the Mantiuk prior art, but notice that our method focuses on keeping the colors good first, and then optimally tune the tone mapping, rather than the other way around. I.e., we may keep the chromatic specification of the colors (e.g. (x,y), or (hue, saturation), etc.)

unchanged, rather than to do a processing on the luminances or lumas of the pixels, and then some color correction. To do this we design our tone mappings (which may be functions directly, or anything which realizes some functional transformation ultimately, like e.g. a computer algorithm composed of substeps which have the functional behavior as end result). Thereto our embodiments typically have a starting input tone mapping (301) specifying approximately how colors should be mapped to say the LDR gamut encoding. But now we will derive new, local tone mappings for different chromaticities (x,y), i.e. the input tone mapping is adjusted or adapted to generate an adjusted tone mapping where the adaptation is dependent on the maximum luminance(s) achievable for the chromatic coordinates of the input color. This can be done by modifying the original input mapping function relatively to its coordinate axis on which it is specified (i.e. we can either scale the function of the input tone mapping itself, e.g. m*f (input) m being a multiplier, or we can change the input to input_scaled, also yielding of course a different output on e.g. a monotonously increasing function which our tone mapping functions will typically be). Note that one can also do nonlinear scaling, e.g. apply a power function or logarithmic transformation etc. to the input axis, which corresponds to bending the function in a nonlinear manner, etc. What our apparatus/method typically uses is at least one linear measurement of the amount of color there is compared to the maximal amount there can be in a gamut (whether for a particular display, or a theoretically defined gamut of a color space), and such a linear quantity can just as well be specified e.g. on the basis of the luminance (L) of the input color. Given this percentual amount of luminance compared to the maximum, our apparatus can decide how to optimally transform it, whether that chosen particular strategy is determined by taking into account further appearance desires in conjunction with gamut/display specifics, simplicity of the algorithm, or other considerations. However, they all seek to focus on avoiding at least color errors resulting from clipping, or at least if the algorithm is integrated in a design which optimizes by allowing some clipping, minimizing that clipping. The skilled reader should understand that this involves never getting an output L* above Lmax(x,y), which for monotonously increasing functions will be the mapping at the highest input end of the tone mapping curve. The skilled reader should well understand how one can realize the many possible variants of such a mapping. It involves determining where the function yields the highest result, and then downscaling by modifying the function, i.e. whatever reshaping one applies below, at least constraining this highest point on it to the maximum allowable value. This may be encoded in various ways, by simple maths for simple cases, and complex cases could just simulate what the result would be, and then applying one which fulfills the requirements.

The approach may thus introduce a tone mapping which is based on an input reference tone mapping that may be independent of the chromaticity of the color, and which specially may be the same for all colors in the gamut(s). However, the tone mapping deformation unit may adapt this generic or common tone mapping to a tone mapping that is specific to the chromaticity of the input pixel, and specifically which is dependent on a quantity that reflects the maximum possible luminance for the specific chromaticity in the input chromaticity. Furthermore, the adjusted tone mapping is such that the adjusted luminance is not above the maximum possible luminance for the chromaticity in the output gamut. Thus, the system allows for a luminance adjustment to the input signal to convert between the different dynamic range while not only ensuring that the adjusted luminance is such that the output image is not clipped but also allowing the same reference mapping to be adapted to the differences in the possible luminance. This may ensure that the transformation of the input color results in an output color of the same chromaticity and with a consistent luminance adaptation across the entire gamut.

For example, the same relative mapping of the full luminance range for each chromaticity may be used despite the maximum luminance being very different in different ranges. E.g. the same relative brightness increase may be applied to saturated colors as to e.g. substantially white colors despite these having a substantially lower maximum brightness level.

The quantity used to adapt the tone mapping may specifically be determined from the input color, e.g. using a look-up table providing a maximum luminance for all chromaticities in the gamut. In many embodiments, the quantity may be a maximum value of a color channel in a color channel representation (such as an RGB color representation) of the input color. In many embodiments, the input luminance may be a luminance in a chromaticity and luminance representation of the input color (such as an xyY representation).

Specifically, the quantity may be indicative of the input luminance relative to a maximum luminance which for the chromatic coordinates of the input color is maximally achievable in the gamut corresponding to the first luminance dynamic range for those chromatic coordinates. It may be advantageous if the image color processing apparatus (201), has the tone mapping deformation unit (203) further arranged to apply a monotonous transformation to the functional shape of the input tone mapping as compared to its axis, which is defined so that if the output luminances (L_HDR) obtained by applying the input tone mapping (301) two different input luminances (L, L_LDR) are different, then the adjusted output luminances (L*) for those input luminances are also different.

Thus, the adjusted tone mapping may be generated by adapting the input tone mapping by applying the transformation to the functional shape.

Many mappings will obey that we introduce no or minimal clipping, hence, one may shape e.g. the middle or bottom part according to some other criterion. If some parts of the curve having the highest values clip (i.e. there are e.g. still different, higher values at the HDR input, but not the LDR output), then such a mapping cannot be used in e.g. a processing strategy where we need invertibility, like an encoding first mapping an input master HDR grade to a (clipping) LDR encoding, and then a reverse mapping to recover the HDR grade from this LDR encoding. It is useful if one keeps the mapping monotonous, which can be done e.g. by some (non-linear stretching). Although some mappings may allow overlap of some colors, these monotonous functions do retain (apart from quantization) a mathematical difference between colors which had different luminances in the original scene, or at least e.g. the master grade representation thereof. Although for some display renderings these differences may not be visible to the viewer sometimes, at least they are encoded, and can be further used, e.g. by image processing applications.

Advantageoulsy, the image color processing apparatus (201) has the tone mapping deformation unit (203) further arranged to apply a smooth transformation to the functional shape of the input tone mapping as compared to its axis, determined to have successive luminance differences (310) for neighboring chromatic coordinates (x,y) between the adjusted output luminances (L*) and the output luminance (308) obtained by applying the adjusted tone mapping (301) to the input color luminance (L) vary smoothly, by roughly similar amounts.

The smoothness, which can also be expressed in the terms of the color difference vector field instead of e.g. transformations on the function 301, is an interesting property to have as a quality criterion for some applications. E.g. a linear compression or non-linear compression out of small parts, or taking into account the shape of function 301 may all be smooth. Then our system doesn't behave very differently from a color mapping which focus mostly on the behavior of the luminance (L).

Advantageously, the tone mapping deformation unit (203) is further arranged to perform the determining of the adjusted output luminance (L*, 309) by applying an adjusted luminance (Ls) as input to the input tone mapping (301), which adjusted luminance (Ls) is derived by applying a function to the input color luminance (L), which function is defined based on the maximum luminance Lmax(x,y), so that an input luminance (L) equal to this maximum luminance Lmax(x,y) is mapped to the maximum possible value of the input luminance (L) for the input tone mapping (301).

Instead of shaping the function corresponding to the input tone mapping, one can shape its axis, e.g. if a simple non-linear compression in the x-direction has to occur. Especially for linear scalings this may be more simple than changing the function, since we then can calculate the normal function 301 on the scaled new input (or use that scaled/adjusted value Ls as input to a lookup-table encoding of the tone mapping, etc.). The adjustment by shaping the axis may equivalently be performed by changing the axis values of the function or by changing the input luminance values.

Advantageously in many embodiments, the tone mapping deformation unit is arranged to generate a scaled luminance by scaling the input luminance by a first scale factor determined from the quantity; determine a scaled adjusted luminance by applying the input tone mapping to the scaled luminance; and generating the adjusted output luminance by scaling the scaled adjusted luminance by a second scale factor corresponding to the reciprocal of the first scale factor.

This may in particular provide advantageous performance with low complexity in many embodiments.

Advantageously the image color processing apparatus (201) uses as function to scale the input color luminance (L) a linear scaling. This simple function is sufficient for many scenarios, and it can be realized (e.g. in an IC circuit) by one simple multiplication.

Advantageously the image color processing apparatus (201) has the tone mapping deformation unit (203) is further arranged to use as quantity linearly related to the luminance (L) a maximum (maxRGB) of a color channel (and specifically linear red, green and blue) components defining the input color (L,x,y). Because of the linearity, we can reformulate our basic method e.g. in RGB space, which minimizes computations, since normally images/video are encoded in a color space derived from RGB (and RGB is used to drive the display).

The maximum color channel component of a color representation of the input color may be used as the quantity. The maximum color channel component is specifically indicative of the maximum possible luminance for that chromaticity as it is the color component which can be scaled the least before clipping occurs. In other words, all scale factors that can be applied to the color channel with the maximum value without resulting in this color channel being clipped can also be applied to the other color channels without clipping.

Advantageously in many embodiments, the tone mapping deformation unit is arranged to generate an adjusted luminance by applying the input tone mapping to the maximum of the color channel components; and to generate the adjusted output luminance by scaling the adjusted luminance by a scale factor dependent on the input luminance and the maximum of the color channel components.

This approach may provide a particular efficient operation, performance and/or implementation in many embodiments. The scale factor may specifically be proportional (or equal) to the ratio between input luminance and the maximum (maxRGB) of the color channel components.

Advantageously in many embodiments, the input color is provided in a color channel representation and the apparatus further comprises a color representation converter for generating the input luminance as a luminance of a chromaticity and luminance representation of the input color by converting the color channel representation of the input color.

This may allow practical and convenient implementation and operation in many embodiments. In particular, the use of different representations for the tone mapping operation and for adapting the tone mapping may provide efficient operation in many embodiments.

Advantageously in many embodiments, the image color processing further comprises an output processor for generating a color channel representation output color by scaling the color channel components of the input color by a scale factor dependent on the adjusted output luminance and the input luminance This approach may provide a particular efficient operation, performance and/or implementation in many embodiments, and in particular in embodiments wherein both the input color and output color are required to use color channel representations. The color channel representations may specifically be an RGB representation.

Advantageously the image color processing apparatus (201) of any possible variant further comprises a tone mapping determining unit (202) arranged to determine the input tone mapping (301, TM*) on the basis of at least one predetermined tone mapping (TM). Specifically, the input tone mapping may be a predetermined tone mapping. Simple variants can just use one global tone mapping for the entire image. However, one can use whatever criteria (e.g. if the method/apparatus operates under control of a final viewer in a display to adapt to his preferences, the criteria may be "the viewer likes brighter blues"), to generate better tailored local tone mapping functions, e.g. for regions in the (x,y) plane, or even specific spatial regions or objects in the image. E.g. one may derive the final input tone mapping 301 to adapt, from at least one other tone mapping specified by the grader (e.g. by modifying it according to e.g. an extrapolation strategy over a region of the (x,y) plane), or by interpolating between two such functions, or by deriving a final function given a complex analysis of a plurality of such prior determined functions (e.g. the reds behave like this in the dark area, so we adapt our orange function based on the dark behavior of the reds, but the yellow behavior for the middle luminances, and look what happens at the near neutrals and determine the bright behavior of the tone mapping for the oranges based on what is specified in at least one tone mapping for the near neutrals).

The basic image color processing apparatus may e.g. be a part of an image handling IC and incorporated in various larger apparatuses, like e.g. an image encoder comprising an image color processing apparatus (201) as described above and a data formatter (613) for outputting at least an output image (Im) comprising pixel output colors of chromatic coordinates (x,y) and adjusted output luminances (L*), or an image decoder comprising an image color processing apparatus (201) as described above, and comprising a data extractor (652) arranged to obtain color data of pixels in an image (Im).

The image decoder may have the data extractor (652) is further arranged to obtain a tone mapping (TM), so that it can do its tone mapping based on e.g. what was already prescribed at the content creation side. E.g. as said above when re-determining local tone mappings, e.g. to do an optimal color mapping for the particular display, it may start from the creator supplied tone mapping TM, and deform minimally, trying to follow it as much as possible.

Where we mainly elucidated the mapping optimization taking into account the gamut by focusing on its bright boundary plane, of course we can do similar methods by also taking into account a dark boundary plane, which e.g. models bad visibility due to surround illumination near the rendering display.

The invention can be embodied in various methods, e.g. a method of image color processing to transform an input color (L,x,y) of a pixel specified in a color representation corresponding to a first luminance dynamic range into an output color (L*,x,y) of a pixel specified in a color representation corresponding to a second luminance dynamic range, which first and second dynamic ranges differ in extent by at least a multiplicative factor 1.5, comprising: determining an adjusted output luminance (L*, 309) for the output color from an input luminance (L) of the input color and on the basis of an input tone mapping (301) and a quantity linearly related to the input luminance (L), the quantity being indicative of a maximum luminance which for the chromatic coordinates (x,y) of the input color is maximally achievable in at least one of a gamut corresponding to the first luminance dynamic range and a gamut corresponding to the second luminance dynamic range for those chromatic coordinates (x,y); wherein the adjusted output luminance is determined by applying an adjusted tone mapping to the input luminance; and determining the adjusted tone mapping by adapting the input tone mapping dependent on the quantity so that any adjusted output luminance (L*, 309) obtained by applying the adjusted tone mapping to any input luminance (L) of all possible input luminances in its extent of valid values [0,1] is not higher than a maximum luminance Lmax(x,y) which for the chromatic coordinates (x,y) of the input color is maximally achievable in the gamut corresponding to the second luminance dynamic range for those chromatic coordinates (x,y).

Or, a method of image color processing wherein the determining of the adjusted output luminance (L*) is further characterized in that it involves determining an adjusted luminance (Ls) for use as input to the input tone mapping (301), which adjusted luminance (Ls) is derived by applying a function to the input color luminance (L), which function is defined based on the maximum luminance Lmax(x,y), so that an input luminance (L) equal to this maximum luminance Lmax(x,y) is mapped to the maximum possible value of the input luminance (L) for the input tone mapping (301).

Or, a method of image color processing wherein the quantity linearly related to the luminance (L) of the input color is a maximum (maxRGB) of the linear red, green and blue (or other color channel) components defining the input color (L,x,y).

Or, a method of image color processing comprising determining the input tone mapping (301) on the basis of at least one further predetermined tone mapping. The invention can further be embodies as a computer program product comprising code enabling a processor to realize any of the methods or functioning of any of the apparatuses, and it can be communicated or directed via signals etc.

BRIEF DESCRIPTION OF THE DRAWINGS

These and other aspects of any variant of the method and apparatus according to the invention will be apparent from and elucidated with reference to the implementations and embodiments described hereinafter, and with reference to the accompanying drawings, which drawings serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions, indications of value levels in charts, etc.

In the drawings:

FIG. 7 schematically illustrates how one can implement a more complex embodiment of our method or apparatus with local tone mapping functions with a higher degree of variability, wherein:

DETAILED DESCRIPTION OF THE DRAWINGS

Figure 1:
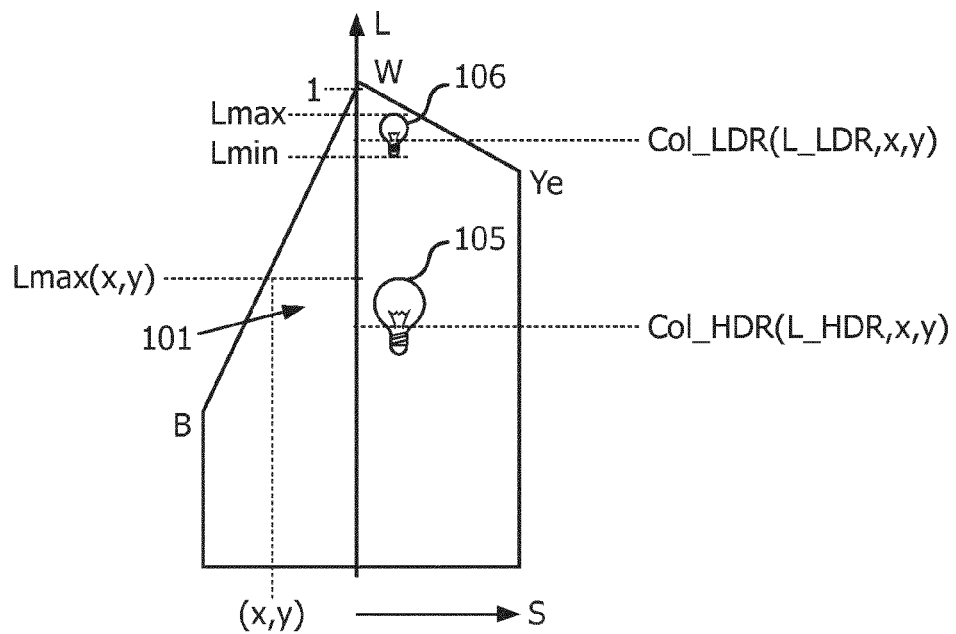
FIG. 1 schematically illustrates a mapping between a color representation/gamut related to a display of a first dynamic range and a color representation/gamut related to a display of a second dynamic range.

FIG. 1 schematically shows a mapping between a first and second color representation associated with a first and second range of renderable luminances (also called dynamic range). Without loss of generality, we will assume that the color representation can be directly used to drive a particular display, by linearly multiplying the color's luminance with the peak brightness of the display. Of course the color space can be an intermediate and e.g. a display-independent color space, which means that before the colors are rendered they need to be optimally mapped for the particular display etc. Although the mapping can also be done the other way around, we will explain the example by mapping from a smaller range of representable luminances (called for simplicity a low dynamic range LDR), to a larger range (high dynamic range HDR). This means that the physical gamut of reproducible colors when a HDR display is driven, will be larger than that of the LDR display. For simplicity we have drawn the color gamuts (which as said we have assumed to be color gamuts being defined for reference gamuts being the actual two displays of different dynamic range, which for simplicity differ only in peak brightness and not e.g. color primaries, and are for simplicity consider to obey a linear electro-optical transfer function, have similar front plate reflection, etc.) of both LDR and HDR normalized to a maximum luminance L equal to 1, so both have the same color gamut 101 then, and color mapping consists of moving colors to different positions in that gamut. It is important to know that the Z-axis of the representation is linear luminance L, and not non-linear (e.g. gamma 0.45) luma Y. This is what we may also call the brightness component of all colors (being 3-dimensional entities). As to the chromatic component of the colors, we have defined them as CIE (x,y) coordinates, but of course other definitions of chromatic color planes would equally be possible for our invention. In this color plane the gamut's base will cut a triangular shape out of the horseshoe or color circle surrounding it, and therein we can (as is well-known from colorimetry), define two further parameters: an angle which we will call hue, and a component from the achromatic L-axis outwards which we will call saturation s (we will also not complicate our elucidation by making detailed discussions on the differences with psychovisual colorfulness). x and y are in fact non-linear quantities, since they are defined as x=X/(X+L+Z) and y=L/(X+L+Z), and that perspective geometry is non-linear. This has inter alia as an effect that the upper limits of the gamut are not straight lines but curves, but the explanation of our invention doesn't change if we assume them to be straight lines. Actually our invention has as a useful property that at least some embodiments may avoid the need to tabulate the actual gamut boundary shape.

Now suppose we have an object in LDR 106, for which we assume for simplicity it has a single color (L_LDR, x,y), for which we want to determine a corresponding HDR color (L_HDR, x,y). For simplicity we assume that the chromatic part of the color definition stays the same, and only the normalized luminance definition changes (but of course our methods may be combined with further processing which also modifies the chromatic definition in a certain way). The assumption is here then that a color stays roughly the same and looks only brighter (on the HDR display) if we give it a different luminance but the same (x,y). Note also the effects of the RELATIVE luminance definition, and how it works with different mapping rationales. E.g., one may desire that the color, say of a face, looks exactly the same on a 2000 nit peak brightness HDR display, as on a 500 nit LDR display. Although the rendered output luminance 2000*L_HDR will then be the same as 500*L_LDR, it means that in the normalized (linear) representation of our FIG. 1, for making the same finally rendered color, the L_HDR will be $\frac{1}{4}^{th}$ of the L_LDR, which can be seen from the lower position of the object along the L-axis. Now there may of course be other mapping rationales for defining the mapping between the first color representation Col_LDR and the second one Col_HDR. E.g., since it is clear that a lower dynamic range display can never exactly render the brighter colors of the HDR display, we may want to APPROXIMATE them. In case the object is e.g. a light source, containing pixel colors within a span of luminances [Lmin, Lmax], we might consider clipping the light source in the LDR color representation (though not in Col_HDR) so that e.g. Lmin is very close to 1 (in a digital 8 bit representation it may be 253 e.g.). It will however be useful in many embodiments that we condition our mappings so that they are to a large degree invertible, in particular that they do not lose too much information of the HDR color representation in case we want to retrieve it from the LDR one, such as happens e.g. in case of severe clipping or quantization, etc. So we may want to do something more complex with the lamp object than simple linear clipping, which is called color grading, and if one wants the highest quality it is typically not done by an automatic algorithm, but at least partially corrected (from an automatic first mapping in semi-automatic grading) by a human color grader, an artist with taste and expertise in defining the colors in the best possible way for both a HDR and an LDR display, i.e. as representations Col_HDR and Col_LDR.

It should be clear to the skilled reader that our method can be applied to transform colors in any scenario, e.g. by a photo correction software, but also e.g. inside a color optimization module of an image processing IC in an HDR television, or any intermediate image processing apparatus, an image optimization service running on a remote networked computer, etc. However, we want to further elucidate this invention when it forms part of an HDR codec we recently invented. In this codec we represent an input master HDR grade (assume e.g. encoded with 16 bit or 32 bit linear L, or as 3×16 bit linear RGB, or encoded in a float representation, etc.) as e.g. a backwards compatible 8 bit (or e.g. 10 bit) LDR image (which can then be compressed with legacy compression like MPEG2, AVC, HEVC, or VP8, etc.), but, also with as metadata a color (tone/luminance) mapping strategy (at least a tone mapping function L_HDR=F(L_LDR), but possibly more encoded color transformation strategies) to derive the HDR color representation (Col_HDR) from how it was encoded as an LDR image (with pixels defined in Col_LDR). I.e. we have graded from the HDR image an LDR image which can directly be used for LDR rendering, and looks reasonably good, as approved by the grader working for the content creator or owner. If this LDR image is directly shown on an HDR display, it doesn't look so good however, since although all objects may be recognizable, typically a lot of the scene objects may look to bright, i.e. they are not optimally graded for an HDR display. Putting all object luminances and colors again in the positions of what the content-creator prescribed HDR grade dictates, is what the color mapping algorithms encoded in the metadata realize when applied to the LDR image. Now this decoding of the LDR image to obtain an HDR image for driving the HDR display, may (as sole mapping algorithm, or part of a set of algorithms) use embodiments of the present method.

Thus, the specific exemplary description may relate to a system wherein an LDR image is typically (semi)automatically generated from an original HDR image. The LDR image is then distributed and may be rendered directly by an LDR display. In addition, one or more tone mapping functions may be distributed with the LDR image where the tone mapping functions provide information on how an HDR image can be generated from the LDR image. The tone mapping functions may specifically describe suitable luminance transformation functions that may be applied to the LDR image to generate an HDR image which closely resembles the HDR image.

Tone mapping to map an HDR image to an LDR image exists in several prior versions, and also a few very approximative autoconversion algorithms exist to transform an input LDR picture (e.g. from a DVD or BD video) into a HDR image with a color representation more suitable for HDR rendering, i.e. e.g. maximizing the usefulness of the HDR display by rendering the brighter objects especially bright. E.g. one could detect bright objects being "lights" in the LDR image (e.g. small regions, such as specular highlights, clipped to 255), and then luminance boost them severely compared to the rest of the scene in the HDR coding (or in fact in the normalized HDR encoding keep them on 255, but lower the luminances [or for embodiments which do not like in our simplified elucidation encode the colors with a luminance encoding, adapt by lowering the code values/lumas corresponding to those luminances] of all other scene objects compared to the LDR luminances), so that they stand out as bright in the rest of the scene. In our example of the light object 105 in FIG. 1, that could mean that in the HDR representation we do not encode the light with a L_HDR=¼$^{th}$ of L_HDR, but e.g. 0.8× L_HDR. It will then render such lights (i.e. the final rendered output luminance from the display) as bright as possible on the LDR display, and exceptionally bright on the HDR display. Tone mapping in the collocated normalized color gamuts specifies then that we should multiply the luminance of the pixels of the light in the LDR image by 0.8, before the ultimate boost realized by the ultimate multiplication by the peak brightness of the HDR display being 2000 nit.

However, normally in prior art this tone mapping is done first, and then some color correction where needed. Indeed, in many prior art approaches a luminance scaling is first applied that may result in clipping or color change for some pixels, and with a subsequent color correction seeking to address such distortions. Of course if the sliders for the different colorimetric transformations work in parallel, a manual-grader may do whatever he wants, but it would make sense to first put the luminances (or brightnesses) correct, and then do some color transformation (in particular because the color is dependent on the luma, in so many applications). In fact, usually, though colorimetrically and psychovisually incorrect, but of course simple (if you are not too concerned about relatively large color errors), people do the processing in the non-linear color encoding spaces like e.g. YCrCb. This is ultimately converted in a RGB driving signal for the display, and typically leads to excesses or to low amounts of at least one of these primaries, i.e. color errors. If one thinks color mapping while retaining a particular Y luma value is the way to process (e.g. over a range of variable chromaticity colors), one should realize that such a processing doesn't even lead to the correct luminances, since the non-linear luma is different from a luminance. So although the variation in luminance over e.g. different colors in the same picture may in some cases be small enough to be of acceptably little concern, the error does exist, and may sometimes be objectionable. A worse error stems from treating the CrCb as if they were luminance-independent chromaticity-coordinates. Changing such coordinates may have relatively severe consequences on both the final luminance of the rendered object, and its chromatic color (i.e. hue and saturation). And in some scenarios even minor hue errors can be problematic (note that human vision can discern errors of a couple of nanometer, or in other words depending on the viewing conditions and the experiment, one may say that at least 100 different hues along the circle are relevant). Also a space like RGB is not fully intuitive and simple to use, even to very experienced graders. Due to the non-linearity, always some (unexpected) discoloration may pop-up, and especially if one has few (maybe not well understood) algorithms to play on (and the UIs may be too coarse, e.g. one may want to change the shape of a tone mapping curve in a particular way, but it cannot be set precisely enough), it may be difficult to do all color corrections up to the hilt (especially in a simple and quick way). E.g. RGB controls seem relatively simple, since if the picture looks too greenish one may diminish the green somewhat, and even for strange non-linear curves one would already quickly have a somewhat less greenish look on average. However, what if one wants to make to picture more yellowish to achieve a cosy evening effect? Then one needs to control both R and G, but then it is still a particular yellow. If one adjusts the gamma slider in HDR image processing software such as e.g. Photomatix, one may encounter issues such as fake colors in the blacks, or incorrect colors for intermediate luminances. If there is any nonlinearity still in the system between where the colors are regulated and where the colorimetric determination of the colors occurs (i.e. the display rendering which adds linear light), one risks discoloration. E.g., if one wants to increase the brightness of mixture of white and a color, one could change in the linear space (W,c) into K^2*W^2+c^2. This would of course involve a certain amount of desaturation. Changing however into (K*W+c)^2, would involve an additional mixing term 2K*c, which is dependent on the amount of color c, i.e. this would result in a different finally rendered color. Sometimes colors seem to come out too pastellish or too cartoonish or highly saturated according to our preferences. There is a color saturation slider which one could use to try to correct for this. Some people may expressly use this to bring some (additional) look into the picture. E.g. one may have a misty street under evening street light, and then one may increase the saturation somewhat beyond the natural to give it a Christmassy yellowish look. Some people even seem to prefer extreme profiles like a highly saturated grunge profile, but we will focus the elucidation of our invention for when one goes for more natural colors. In any case, getting the colors in their three colorimetric coordinates right over the entire image (and for video consistent over shots of successive images) is not always a simple task. Also dependent on how one defines the color transformation, especially if the grader wants to apply somewhat wilder tone mapping functions (which will perhaps not occur often under normal color correction with near equal gamuts, like correcting for partial programs from multiple cameras in the field, but is highly likely when highly spread luminance ranges with several important luminance subranges have to be mapped to display gamuts of very different capability), one should be careful that the colors don't become too strange, too strange even that they cannot be further corrected easily. In our example of HDR encoded as legacy LDR+metadata for tone/color mapping that LDR to HDR (which may be called "LDR container" HDR encoding) we need to make sure that if we create the LDR image corresponding to the HDR master grade, its colors should not be too different from the master grade, and preferably even be as similar as possible according to some matching quality criterion or strategy, e.g. at least the darker colors being rendered the same on both displays, as far as the LDR display gamut allows this.

Thus, in many scenarios, it is highly desirable that a conversion from e.g. LDR to HDR images can be performed which does not introduce significant color changes to the image. This is often very difficult to do and especially most prior art approaches tend to introduce color distortion when converting between different luminance dynamic ranges with these distortions then needing to be addressed subsequently (or the corresponding degradation must be accepted).

Figure 2:
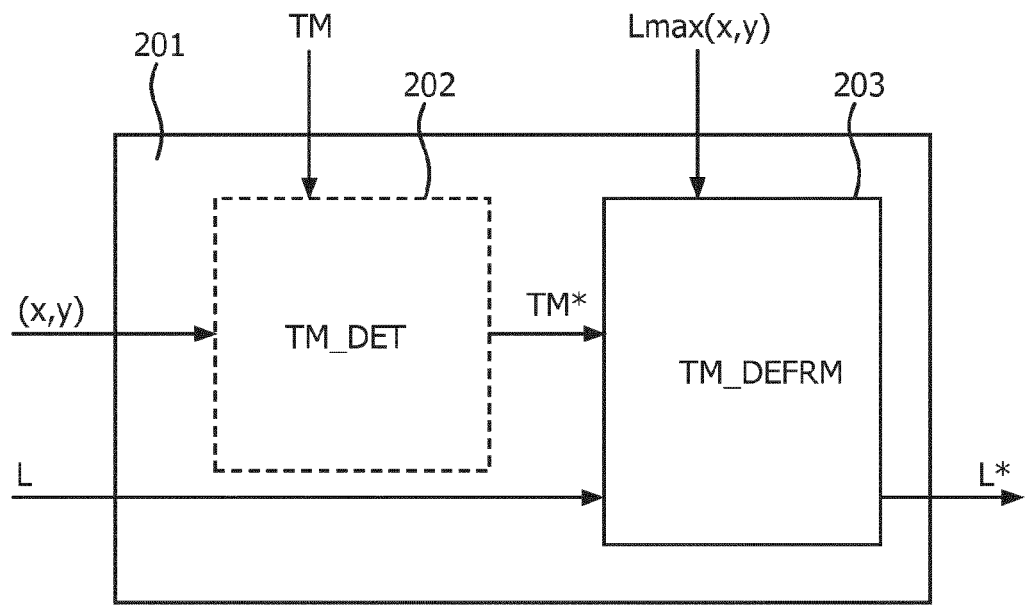
FIG. 2 schematically illustrates a possible realization of a core apparatus according to the present invention.

FIG. 2 schematically shows how generically an image color processing apparatus 201 covering most of the embodiments of our invention enabling core behavior of the method may look like. The skilled reader will understand this core module part may interlink with various other modules for e.g. storing or supplying pixel colors, units using the mapped color or at least its (output mapped) luminance L*, etc., and that these basic blocks can be realized e.g. in an integrated manner as a software program running on a processor. A tone mapping determining unit 202 determines an input or reference tone mapping TM* for the current pixel. In more simple embodiments this input/reference tone mapping may have been determined based on typically how the luminance values of objects of the input image to be mapped are distributed, and we may have a global mapping function for an image (or shot of images etc.). Thus, the input tone mapping may be a mapping which is not specific to the individual pixel but which may be the basis of the dynamic range conversion for a plurality of pixels, such as e.g. a region of the image or set of images, and entire image or a whole group of images. The input tone mapping may be a mapping which is not specific to the individual chromaticity but which may be the basis of the dynamic range conversion for a plurality of different chromaticities, and specifically may be completely independent of chromaticities (and may only be a function of luminance). The input tone mapping may thus be a reference function which prescribes a relationship between input luminances and output luminances.

According to the teachings of embodiments of our method, we will want to transform this mapping then in new mappings for different chromatic (e.g. hue, saturation) subranges, e.g. per value of the input (x,y) chromaticities. Thus, in the approach, the non-chromaticity specific input tone mapping may be adapted into an adjusted tone mapping which is specific to specific chromaticity values or ranges. The adjusted tone mapping may specifically be one that reflects the characteristics of the input tone mapping (e.g. in terms of the shape or variation of the curve relating the input and output luminances) but which has been adjusted to suit the specific characteristics of the chromaticity of the pixel being transformed. Specifically, the adjusted tone mapping is generated in dependence on a value/quantity/parameter which is indicative of the maximum luminance that is possible for the chromaticity of the pixel being converted. Thus, the adjusted tone mapping that is applied to the pixel may reflect the input tone mapping (which e.g. may be specified by meta-data received with the LDR data) but also the specific characteristics of the individual pixel. The approach may specifically be used to introduce a desired conversion between the luminances of the different dynamic ranges while ensuring that this does not introduce color distortion and therefore does not require a color correction post processing. Thus, improved luminance conversion without color degradations can be achieved in many scenarios.

Of course, our method works also with possibly much more complicated tone mapping strategies where there are several tone mapping strategies defined, e.g. the tone mapping may also be determined e.g. based on what area in the image the pixel comes from etc. Typically in an embodiment configuration, the input/reference tone mapping TM* to be optimized for a particular chromatic region of the color encoding gamut e.g. an (x,y) value, will depend on at least one supplied tone mapping TM, which may e.g. be (pre)created by the grader for the entire image (say e.g. a gamma function with coefficient gam>1, which mainly brightens the brighter regions or darkens less bright regions). When we say precreated the reader will understand this could be at the same time moment in case image color processing apparatus 201 forms part of a grading engine at the grading house, but TM may also come from e.g. a detachable memory like e.g. a BD disk or over a network connection, if the apparatus 201 forms part of e.g. a television or display, and the tone mapping TM was determined months earlier. In case we have only a single tone mapping TM, it could be transmitted directly (as the input tone mapping TM*) to a tone mapping deformation unit (203), making unit 202 optional, however, as we will see below, there can be embodiments where several (at least one additional) tone mapping functions (or in general strategies) are determined for different chromaticities (x,y), which would then be performed by unit 201. Thus, in some embodiments, the input tone mapping TM* may be the only reference tone mapping considered and available. In other embodiments, the input tone mapping TM* may be selected from a plurality of possible reference tone mappings.

The tone mapping deformation unit 203 may specifically determine a new tone mapping, referred to as the adjusted tone mapping, which is shaped according to a maximum possible luminance in the normalized display gamut (or in case of non-normalized equivalent embodiments, the more limited of the two gamuts) for the (x,y) value of the pixel color being processed, namely Lmax(x,y). Specifically, the tone mapping function may be reshaped relatively to the incoming luminances L (which are known to fall between [0,1] in the normalized representation), so one can realize similar behavior whether applied (partially or fully) to the tone mapping function, or its input parameter L.

Figure 3:
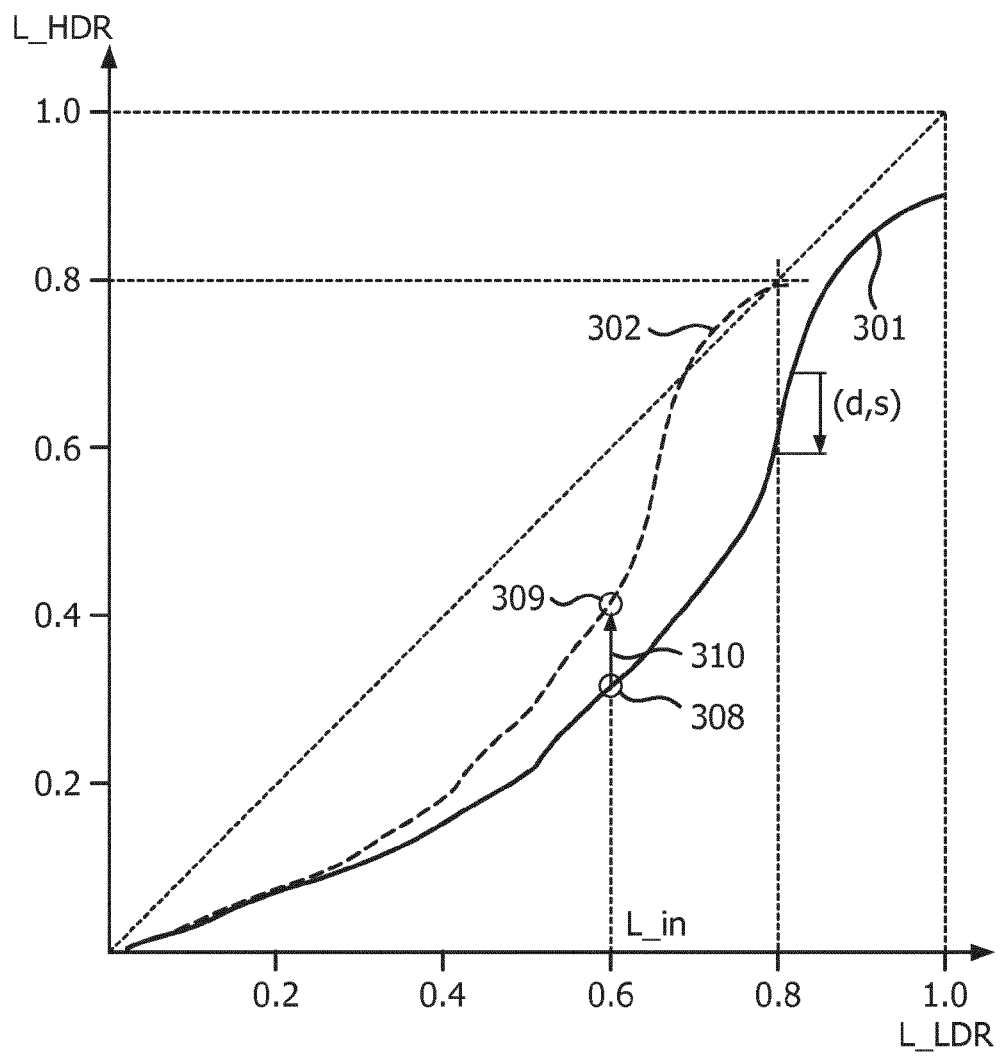
FIG. 3 schematically illustrates how one can change a tone mapping function relative to the range of its input and output, to arrive at a more suitable local tone mapping function, in particular one that avoids clipping of an output color by a physical gamut of realizable on a display and/or representable colors.

We explain one simple possible example in FIG. 3 of how this tone mapping curve shaping can be implemented.

Contrasting with tone mapping methods to generate an image of higher or lesser luminance dynamic range (i.e. to be used with a different peak brightness) which first determine the luminances (or lumas) and then modify the colors (usually to correct for errors which occurred in the first step), our method typically starts with the chromatic part of the color, e.g. (x,y), and leaves that unchanged (so the chromatic look of the image objects is already largely correct). Thus, the chromatic part of the output color/pixel is selected to be the same as the input. Thus, the (x,y) of the output may be set to be identical to the (x,y) of the input. The system then changes the luminance for that color under the constraint of keeping the chromaticity (x,y) constant (which is easy to do, one just has to one-dimensionally change the L-component of the pixel colors). Thus, for an xyY representation, the xy of the output is set equal to the xy of the input, and the Y of the output is generated from the Y of the input based on the adjusted tone mapping.

Of course the skilled reader understands that also with our method we can depart from this starting principle of keeping the chromaticity absolutely unchanged, e.g. if the grader would like to do a further color tuning for whatever reason. But typically our method will function so that a new color is determined with a mapping from the original to the final luminance (L to L*, or e.g. L_LDR to L_HDR) while keeping an output chromaticity (x,y)* after processing equal to (x,y) of the input color, and then optionally that (x,y,L*) may where desired go through a further color transformation operation for modifying the chromatic look of the color(s).

Now suppose that the grader has determined a single tone mapping function 301 for the image (or maybe a shot of successive images of a scene in the movie), which say is determined largely depending on the color behavior of the achromatic colors (i.e. the greys on the L-axis which run ranged as L_LDR in [0,1] and L_HDR in [0,1]). This exemplary function first has a small slope for the dark regions, because the HDR finally rendered luminances will be boosted compared to the encoding by a factor PEAKBRIGHTNESS_HDR/PEAKBRIGHTNESS_LDR of the maximum or desired maximal brightnesses of the two displays, and because we may have as rendering quality criterion that we want these dark colors to look (almost) the same on both displays. Afterwards for the brighter colors (which may be e.g. the colors of a sunny outdoor scene as seen through windows of a relatively darker room in which the camera was situated) we start boosting the colors with an increasingly steeply sloped mapping, to make them relatively bright on the HDR display. In this example we have considered that there are lights which are e.g. too bright for comfort on the HDR display (perhaps for a given user, if the tone mapping TM was finetuned by him on the top end starting from a basic tone mapping from the movie creator), so instead of driving the HDR display to its maximal possible brightness, in this example the tone mapping was leveled-off a little for the brightest image regions. An example of such an input or reference tone map is shown by curve 301 in FIG. 3. The tone mapping/function 301 of FIG. 3 is thus a generic tone mapping which in the described approach is adapted to the characteristics of the specific chromaticity (x,y). Thus, it may be desired for the tone mapping characteristics to be reflected in the mapping for all chromaticities. However, for some chromaticities the maximum possible luminance is substantially lower than the maximum luminance for the gamut (i.e. for white), and therefore only a subset of the curve would be utilized if the curve 301 was used directly for the tone mapping. For example, for a saturated red, only the characteristics of the low and mid luminance range would be used and the tailing off in the high range would not be reflected in the transformation.

A question is then how can one in a simple exemplary manner shape this tone mapping function 301, to obtain a good new tone mapping according to our invention 302 for each particular (x,y), which will be used to determine the output luminance L* for an input luminance of the current running pixel color of say L_in=0.6? We can stretch the function by simple linear multiplication, so that it yields as output L_HDR the maximum allowable luminance value Lmax(x,y) for that (x,y) in case the input color has that maximum allowable value as luminance L. E.g. if the end point of curve 301 was (1.0,1.0), and Lmax(x,y) for the current pixel on the edge of the gamut is 0.8, we would compress that curve so that it ends at (0.8,0.8). Since we know that the input color to be mapped can never have a luminance of higher than 0.8 for such a chromaticity, but it can have a lower luminance than 0.8 (e.g. 0.6), we know that such a linearly scaled function can for lower luminances never result in a L_HDR above 0.8 (provided that we scale the maximum of whatever mapping function is used on that 0.8). So we have already taken care of the fact that no clipping will occur, which clipping typically results in severe color artefacts.

Thus, as an example, in FIG. 3, the curve 301 is modified such that it fits the maximum luminance in the gamuts for the chromaticity of the input color. In the example the input and output gamuts are based on primaries having the same chromaticities and thus the relative maximum luminance for each chromaticity is the same. E.g. in the example, the maximum luminance for the considered color is 0.8 of maximum luminance in the gamuts (i.e. for white). The curve 301 is accordingly adjusted such that the endpoints of the curve are at the maximum luminances for the chromaticity (i.e. at (0.8, 0.8) in the specific example). An example of such an adjusted tone mapping 302 is illustrated in FIG. 3.

The adjusted tone mapping 302 may specifically have a shape corresponding to the input tone mapping 301 but compressed into the range corresponding to the possible luminances for the specific chromaticity. As a result, the luminance transformation will not only reflect characteristics of part of the input tone mapping but will reflect the characteristics of the entire curve. The approach therefore not only ensures that no clipping is introduced by the luminance transformation (and thus that the chromaticity is unchanged) but also allows for a transformation more in line with e.g. the graders preferences for the transformation.

A question related to this approach is that of which mapping functions are desired in various embodiments of the apparatus 201 and method? We could use e.g. any invertible (i.e. one-to-one mapping of L_LDR and L_HDR) function. Because then we can map from HDR to LDR and back (however some embodiments of our inventions may use non-invertible functions also, e.g. in applications where we only want to transform from LDR to HDR it may be acceptable if for some reason some different LDR colors are mapped to identical HDR colors, although usually from a visual quality criterion that is less preferable). E.g., a discrete function which maps (when stated in [0,255] formulation) L_LDR=0 to L_HDR=1, 1 to 3, 2 to 2, 4 to 5, 6 to 12, 7 to 8, etc would be invertible. But more preferably we would use monotonous functions (in fact monotonously increasing functions), so that the luminance order between colors in the LDR and HDR image is not changed (too much), and some variants may not want to change differences or fractions of successive colors in both pictures by too much neither. But the mapping function need not be first order continuous (i.e. there may be a discontinuity mapping e.g. 128 to 200, 129 to 202, and 130 to 1000, and 131 to 1002). Some embodiments may however use continuous functions, which e.g. are composed of segments of power functions (e.g. multilinear, multi-curved spline) or similar shape, and they may be generated by a grader dragging control points. Or a grader may draw some control points and a function is interpolated between them. Usually the functions will implement some local behavior for important color regions in the image, brightening and or contrast modifying those. So the local slopes of the functions could vary quite a lot, as long as they do not become zero, which would make the function not invertible. The grader may also use e.g. a button which toggles between increasingly steep gamma functions (gam=1.2, 1.5, 2, 2.5, 3, . . . ), or design local-compressive functions like S-curves etc. Now this algorithm works nicely (especially if one also limits the selection of mapping functions to use) because of a certain number of colorimetrical properties.

With a prior art algorithm focusing predominantly on the luminance specification (i.e. fixing that first, and then modifying (x,y)* to address chromaticity distortion), one would e.g. transform input color (x,y,0.6) into (x,y,0.28) (color 308). However, with our herein presented algorithm we would obtain the output color Col_HDR being (x,y,0.37), i.e. the chromaticity would inherently be the same. The luminance may be somewhat "off", but at least the color looks the same. According to what the criterion and test is, sometimes the brightness of the color is more important than the hue e.g. (e.g. to create impact in an image), but in many applications like our LDR_Container encoding, having an incorrect hue, or saturation may be a more severe problem (this also depends on what object one is rendering (e.g. a face), under which situation, etc.). Does the viewer really care about the absolute luminance of a color: if he doesn't see the original scene, and as long as it doesn't become unnaturally bright. E.g., as long as a lamp in the image is excessively bright, we already have a HDR effect. And it would look different on a brighter (10000 nit) or darker (2000 nit) HDR display anyway if we drive it with the same color encoding. Especially important, many colors would look different luminance-wise on the LDR display, since we can't make them bright enough anyway, so each tone mapping algorithm already has to make sacrifices. So what would make the criterion "all colors should have identical luminance behavior whatever their chromaticity", i.e. have their luminance mapping determined by a mapping curve determined for the achromatic axis, the only good criterion. Secondly, even if one of the criteria would be the right one, the field of color differences 310 (or in fact normally luminance differences) is normally, if not already small, at least smoothly varying over the color plane. Now such smooth variations are already difficult to spot given the color space is sparsely sampled by the particular objects actually present in the image, but in fast video, except if one would have annoying course-level fluctuations, the viewer will be concentrating on the story rather than on small color changes. Such deviations are also allowed because human color vision estimates the true spectral nature of scene objects with only three cones, which furthermore are not perfectly designed mathematically, but came to be through however evolution changed the animals. Therefore in regions of non-perfectly sampling overlaps, the brain has some difficulty to, at the same time, accurately judge hue, but also brightness and colorfulness/saturation. So although the human visual system can be amazingly discriminating at times, in other occasions in practice it may judge the color representation to be at least reasonable enough. Furthermore, this strategy can be interpreted by the brain as the local color objects modulating a single tone-mapped/shaped illumination by the spectral characteristics corresponding to their chromaticities, since the display gamut upper boundary roughly follows how objects of various colors behave luminance wise (i.e. filtering some of the light away by e.g. absorption).

So not only does this mapping produce good colorimetric results, but it is also simple to implement, which is both useful in apparatuses at the grader's side (who can do fast realtime shown grading changes), and consumer products like e.g. displays, like mobile displays, or image handling apparatuses like settopboxes, which in view of price erosion may desire simple image processing IC blocks.

Due to relativity, scaling a function, is equivalent to scaling axes. Of course in a most generic form of our method, the function need not necessarily be just scaled, as it may e.g. also be deformed further at its lower part corresponding to darker colors, as long as the high end performs color transformations within gamut, i.e. typically for monotonous functions, the upper value (in principle of both the argument and the result of the function, i.e. L_LDR and L_HDR, but at least the maximum possible resulting L_HDR in case of e.g. a mathematical mapping procedure containing transformation step prescriptions instead of a simple function; e.g. one also realizes non-out-of-gamut behavior if not inputs equal to Lmax (x,y) but e.g. equal to a*Lmax(x,y)+b are mapped to Lmax (x,y), although simple embodiments will just use a=1 and b=0) coincides with the local for the chromaticity maximal luminance Lmax(x,y).

Figure 4:
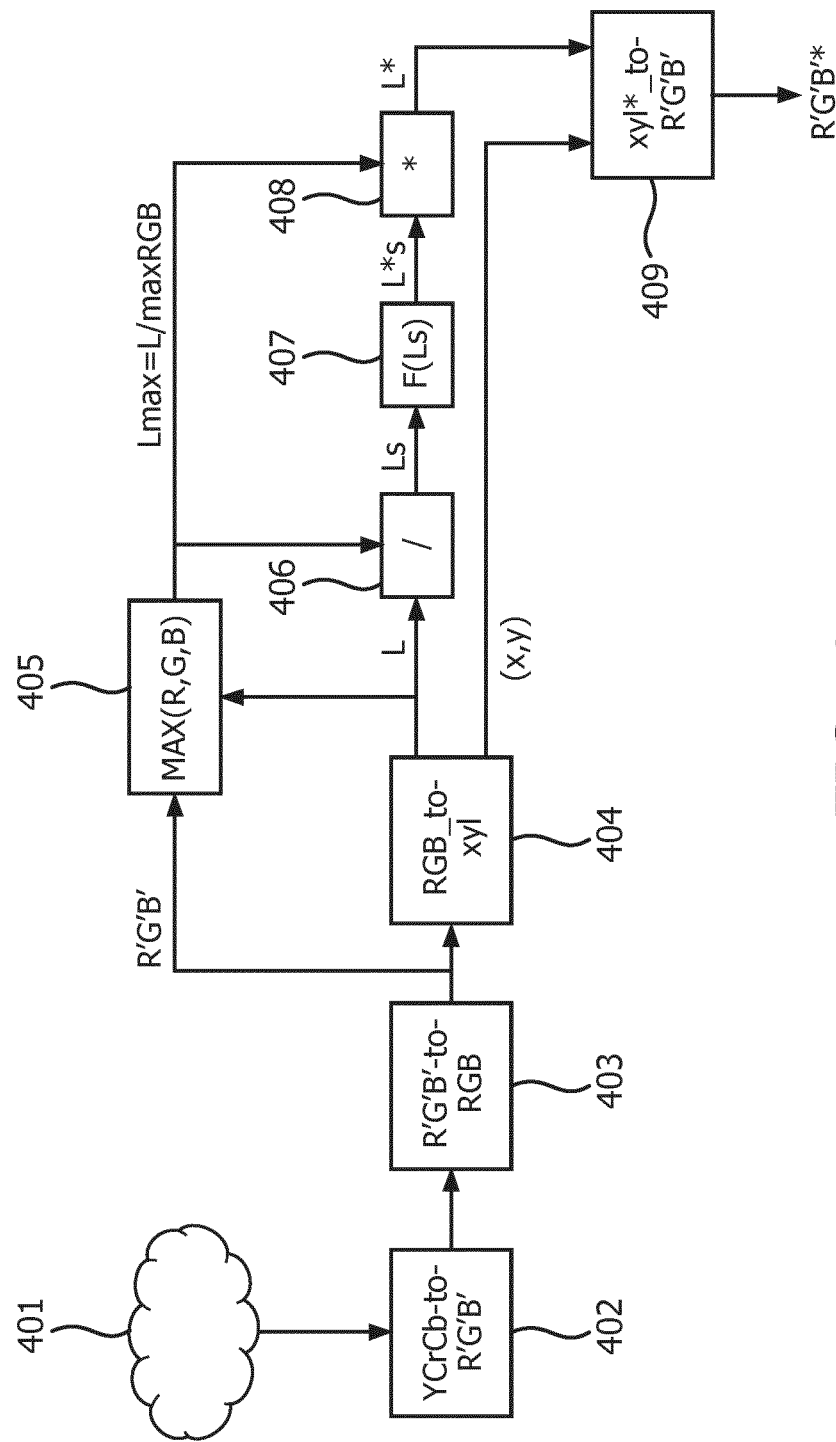
FIG. 4 shows a more detailed embodiment of an apparatus according to our invention.

FIG. 4 shows an example of how one may realize the color mapping of our method in case we use the tone mapping as specified (i.e. undeformed, not scaled), but realize the same behavior by transforming the input value of L_LDR to it. Any reader skilled in colorimetry will understand how he can change or substitute units which e.g. use another colorimetric input color specification in various possible color handling apparatuses (e.g. a camera sensor part when the method is applied in-camera for obtaining an output JPEG image).

A source of image data 401 supplies the pixel color information into this embodiment of image color processing apparatus 201. The source may be e.g. a memory, a network connection, an image generation unit like e.g. a computer graphics generation unit or a camera sensor, etc. One (integrated) or several (first, second, third) color space convertors (402, 403, 404) convert pixel colors (per pixels, or even based on image regional information etc.), from typically a starting color space (like YCrCb if the color source is e.g. an encoded television signal, say from a satellite via a receiving apparatus), to e.g. non-linear R'G'B' (the ' denoting a gamma of e.g. 0.45), and then to linear RGB. In this linear RGB we want to do processing, because it has useful properties (although our method could also be alternatively designed to work e.g. in a nonlinear space). An image analysis unit 405 analyzes the image, and in this example the current pixel's color. From its three color components R, G, and B, it determines the highest one, called maxRGB. So if the color is e.g. in normalized coordinates 0.9, 0.3, 0.85, then maxRGB=0.9. This maxRGB value is important, because clipping occurs when one of the driving values, after a color transformation, should be higher than 1.0. Color errors also can occur when one of the values drops below 0.0, and we can mutatis mutandis design our algorithm with that consideration in mind (aligning a bottom part of the mapping curve e.g.), or even consider that values should be higher than say e.g. 0.1 in view of surround illumination on the front screen, which corresponds to limiting the gamut with a lower limiting surface not being the ground plane (L=0). However, for simplicity we will assume the behavior around 0 is simple, and explain our algorithm only with the limiting behavior at the high luminance end of the gamut.

In the example of FIG. 4, the maximum (maxRGB) of the components of the color channels representing the input is determined, i.e. in the specific example the largest component of the R, G or B color channels is determined. This value is a quantity that is indicative of the maximum luminance for the chromaticity of the input color/pixel and specifically it reflects the ratio between the current luminance and the maximum luminance which is possible in the gamut without clipping. For example, for an input color given by the values RGB=(0.9, 0.3, 0.85) the value maxRGB=0.9 indicates that the luminance of the input color is 90% of the maximum luminance possible. Indeed, this reflects that the maximum relative luminance increase possible for that chromaticity without any clipping is a scaling by 1/0/9=1.11. Thus, the maximum luminance for an input color with that chromaticity is (1, 0.33, 0.94). The maxRGB value thus provides a quantity which is used to adapt the input tone mapping to generate an adjusted tone mapping specific to this chromaticity.

In the specific example of FIG. 4, the input luminance to the adjusted tone mapping is the luminance L from the third color space converter 404 and the resulting adjusted luminance for the output color is the value L* which is dependent on both the input tone mapping and the maxRGB values. Thus, the adjusted output luminance L* depends on the input tone mapping, the maxRGB value and on the input luminance.

In the specific example of FIG. 4, the adjusted tone mapping is based on the input tone mapping but adapted by scaling both the values on the input and the output of the input tone mapping. Indeed, first the input luminance L is scaled by a first scale factor in a first scaler 406 to generate a scaled luminance, The input tone mapping is then applied to this scaled luminance in tone mapper 407 and the resulting output is then scaled by a second scale factor in a second scaler 408 to generate the adjusted output luminance L*. The first and second scale factors are the reciprocal of each other, and thus the second scaler 408 compensates for the effect of the first scaler 406.

Furthermore, the first and second scale factors are determined from the indication of the maximum luminance for the chromaticity. In the specific example, the first scale factor is equal to the reciprocal of the maximum luminance for the chromaticity and the second scale factor is equal to the maximum luminance for the chromaticity. Thus, effectively the approach provides a normalization of the input luminance relative to the maximum possible luminance for the chromaticity, and then applies the input tone mapping to the normalized luminance. The second scale factor then multiplies the result by the maximum luminance for the chromaticity to reverse the normalization. The overall effect is that the input tone mapping is scaled to the specific maximum luminance for the chromaticity. E.g. the approach corresponds to the scaling illustrated for curves 301 and 302 in FIG. 3. In the specific example, the maximum luminance for the chromaticity is calculated as the input luminance divided by the maxRGB value.

Thus, the approach is based on the consideration that we want to apply our normal tone mapping curve 301, not to the original luminance of the pixel L, but to some modified luminance L*, which is e.g. multiplied by a factor 2, if the scaled tone mapping 302 was obtained by dividing the original one 301 by a factor 2.

So, if the luminance of the pixel currently processed would be on the gamut boundary (i.e. L would be equal to Lmax(x, y), say 0.8), we would apply to it the scaled processing, i.e. treating the input/argument as if it was 1.0, and treating the function result/output as if it was 1.0, but now scaled to 0.8. If L happens to be half the maximum value for the scaled curve, i.e. 0.4, we would treat it as if the scaled input value Ls was half the maximal value for the original curve 301, i.e. 0.5, and lookup the function output for that value.

In the example of FIG. 4, the image analysis unit 405 is arranged to calculate a scaling factor being the current luminance L divided by maxRGB. The advantage of this is that, although some embodiments of our invention could keep in memory a table of all Lmax(x,y) values, we do not need to know anything about the upper gamut plane shape, like e.g. parameters of splines modeling it. This is because we can determine how much L can increase to its maximum Lmax (x,y) from the maxRGB value, which is an easy scaling operation in linear spaces like RGB and xyL (where all that's needed is that L is linear). E.g., we know that L=0.4, and this could be any color in the local span [0, Lmax(x,y)] from a color which can still be boosted by a lot, up to a color on the gamut boundary. But now say maxRGB is 0.5, and that it is actually for that color (hue, saturation or x,y) R is the highest of the three primaries, i.e. we need most of that primary to make the color, i.e. it will clip first when raising the color's luminance L. We know that we can still boost the linear R by a factor of 2, so we can boost L with a factor of two (because it's a linear combination of R,G,B with the same weights, and the boost factor can be put as a multiplier outside of the addition). So unit 405 has calculated that firstly the local Lmax(x,y) equals 2*0.4=0.8, and secondly, that the actual pixel luminance is halfway the range of possible luminances (as output result of the color/tone mapping). So we should apply in tone mapper 407 the function to the input being halfway [0,1]. Now clearly, the original L being 0.4 is not halfway. So we scale L with a first scaler 406 so that it does become the right value of scaled luminance Ls on the [0,1] range from L defined on the [0, 0.8] range. We can do that e.g. by dividing with the obtained value L/maxRGB. Actually, we can just apply maxRGB as input to the tone mapping function 301, as that will yield the right input position on the [0,1] range, since L/(L/maxRGB)=maxRGB. So then tone mapper 407 obtains the L_HDR value for that 0.5 L_LDR input. Then of course a second scaler 408 is needed to do the actual scaling to the range [0,0.8] because otherwise we could have e.g. a tone mapping function 301 with a very gentle slope for the bright end, which stays well above 0.9 for inputs above 0.4, and still have clipping. So second scaler 408 scales the scaled output L*s again to the local luminance range [0,0.8], or in fact [0, Lmax(x,y)], yielding the final L* within non-clipping range. E.g., if 0.4 became m*0.4, and that yielded an output of L*s=1.0−d, then the final result would be (1.0−d)/m=(1.0−d)*Lmax(x,y)<Lmax(x,y).

Finally a color space convertor 409 converts the pixel colors from the (x,y,L*) definition to whatever color definition is desired by the application, e.g. an output nonlinear RGB-triplet R'G'B'*.

Figure 5:
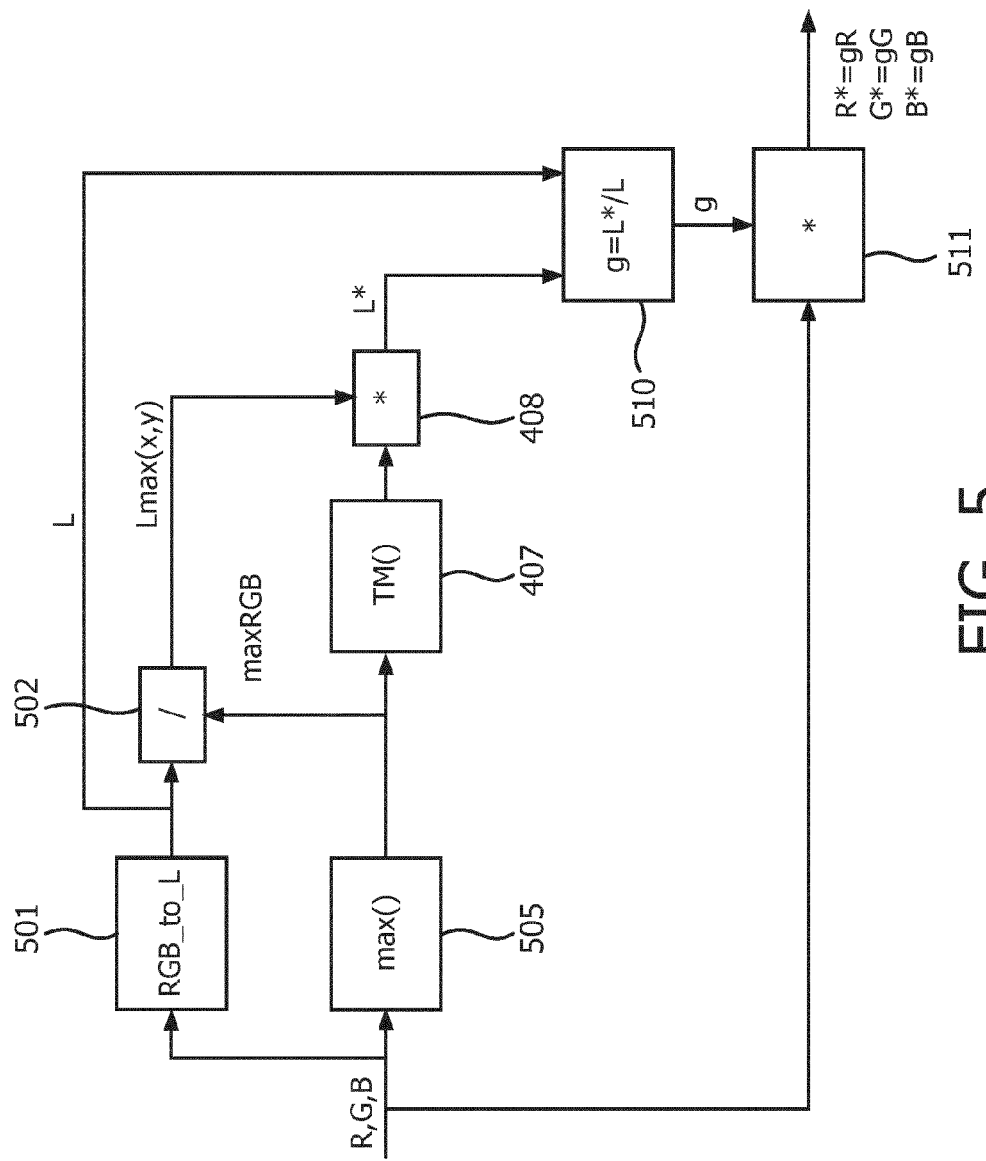
FIG. 5 shows another embodiment, which is relatively cheap to implement.

The skilled reader will understand that this principle can be realized in many ways, and embodiments which have some preference are those which do as few calculations as possible. As shown in FIG. 5, we can perform the operations on linear RGB color encodings, reducing the number of computations, by e.g. avoiding the color convertor 409. This embodiment of apparatus 201 performs essentially in the top part the same: determining the scale factor Lmax(x,y), and obtain the tone mapped L* value. In this embodiment, unit 405 doing the full mathematics for determining the scale factor has been split in a separate maxRGB calculator 505, and a divider 502. Also, instead of doing a full color transform to xyY, since we don't really need (x,y) as the information is implicit in R,G,B, luminance determining unit 501 need only calculate a*R+b*G+c*B, where a,b, and c are predetermined constant function of the color primaries employed by the (reference) display, e.g. EBU primaries. As said above, maxRGB is now the input to the tone mapper 407 which uses curve 301. After final scaling by scaler 408, we obtain the correctly scaled transformed luminance L*.

New compared to FIG. 4 is now a gain determination unit 510, which calculates a gain factor. Again because of the linearity of RGB space, and we didn't change the chromaticity (or hue and saturation) of the inputted color, the luminance change is a mere boost with gain g, which can also be applied directly on the linear RGB components of the pixel. I.e. the gain equals the luminance of the final color L* divided by the original input color's luminance L, and a multiplier 511 (or three multipliers in parallel) multiplies R,G, and B respectively with that same g to obtain RGB*, the linear output color encoding.

In more detail, the approach of FIG. 5 utilizes the fact that L/(L/maxRGB)=maxRGB and thus directly applies the maxRGB value to the input tone mapping of the tone mapper 407. In response, the tone mapper 407 generates an adjusted luminance. The output adjusted luminance is then generated by scaling this value by a suitable scale factor in the second scaler 408. The scale factor for this scaling is generated as the maximum luminance for the chromaticity, and specifically is generated as the input luminance L divided by the maxRGB value. Thus, the scale factor of the second scaler 408 is dependent on the input luminance and the maximum of the color channel components, i.e. the maxRGB value.

It will be appreciated that the approaches of FIGS. 4 and 5 are equivalent and essentially amount to the same processing but with different implementations. In particular, it is noted that for both examples, the adjusted output luminance L* is generated in dependence on the input luminance L and a quantity reflecting the maximum luminance for the chromaticity (maxRGB in the example), and based on the underlying reference or input tone mapping. Thus, both approaches perform a tone mapping from the input luminance L to the adjusted output luminance L* using an adjusted tone mapping which is generated from the input tone mapping in response to a quantity indicative of the maximum luminance possible for the chromaticity of the input color in the gamuts.

Also, it is noted that the approaches of FIGS. 4 and 5 can be considered to use input data from two different color representations of the input color. The luminance of the color corresponds to the luminance of a representation of the input color in a chromaticity and luminance representation, such as an xyL representation (and is not merely a color channel component value). The adaptation of the input tone mapping is based on the maximum component value for color channels of a color channel representation, and specifically of an RGB representation. Typically, the input color is provided in only one representation, and the apparatus accordingly comprises converters for converting between the different formats as required.

In the example of FIG. 5, the input color is provided in a color channel representation and specifically in the RGB representation. Similarly, the output color is provided in a the same color channel format (i.e. the RGB representation). Rather than converting a representation of the tone mapping result from an xyL* format to the RGB format, the approach of FIG. 5 includes output circuitry which directly generates the RGB representation of the output color by scaling the RGB representation of the input color.

Specifically, the output circuit comprises the gain determination unit 510 which proceeds to generate the ratio between the adjusted output luminance L* and the input luminance L. This ratio indicates the amount that the input luminance should be increased in accordance with the adjusted tone mapping. It should be noted that due to the luminances being relative luminances with respect to the maximum luminances in the different gamuts, the determined scale factor inherently reflects the change in the dynamic ranges between the input and the output.

Due to the linear nature of the RGB representation, the RGB representation of the output color is accordingly generated by the multiplier 511 individually multiplying each of the RGB color channel components by the determined scale factor g. As a result, the output of the multiplier 511 is an output color having exactly the same chromaticity as the input color and a luminance as determined by the adjusted tone mapping.

Figure 6:
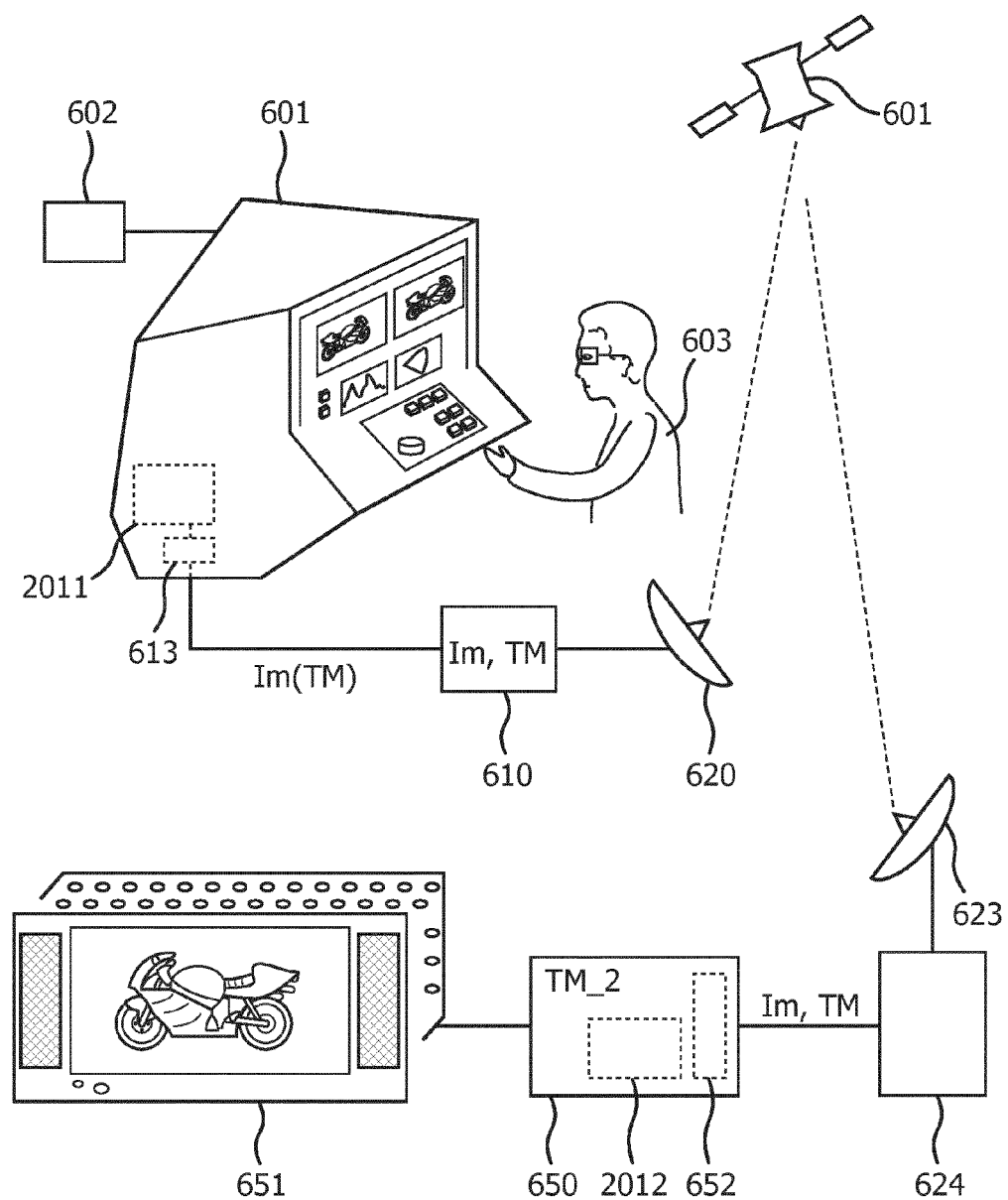
FIG. 6 schematically illustrates how one can interconnect various versions of our apparatus in a total video chain.

FIG. 6 shows just one example networked total system, comprising two subsystems using an embodiment of the invention. The first subsystem is a grading system at a content creator's site. A color grading apparatus 601 takes a raw image or video from an image memory 602, which raw video may e.g. be as captured by a digital camera like an ARRI or RED. The grader does primary color corrections to obtain a master HDR image (/video), and we assume he also makes an LDR image, according to e.g. the LDR_container principle by tone mapping the master HDR image to an 8 or 10 bit MPEG compressed final image Im. This tone mapping is performed by a first embodiment 2011 of our image color processing apparatus 201, which may be embodied as e.g. a software module of the color grading apparatus, which may be arranged to also perform other operations. For this, color grader 603 determines at least one tone mapping function (301, TM) (or algorithm). Of course our method can also work with fully automatic conversion strategies without a grader, where e.g. tone mapping functions are determined by analyzing the statistical distribution of the image, microproperties like the contrast of local textures, etc. The (LDR) image Im, and optionally also the tone mapping TM itself (as it contains useful information, and necessary information to reobtain exactly the HDR master grade if the LDR image Im is the LDR_container encoded version of that HDR image), are stored in a second image memory 610. After some time, this image data (Im and optionally TM) may be communicated to an image/video broadcaster 624, e.g. via satellite 621 and antennae 620 and 623. This broadcaster may then at its desired time transmit the image or video to end users, e.g. over cable, or alternatively video on demand over internet, etc. In the subsystem at the viewer's side, an image processing apparatus 650 gets the image Im and possibly the tone mapping TM. We assume it determines its own new tone mapping TM_2, e.g. to convert now the LDR image Im in an HDR image suitable for driving an HDR display 651, e.g. a television, or movie projection system, etc. The image processing apparatus 650 comprises a second embodiment 2012 e.g. any of the above described embodiments of the image color processing apparatus 201. We show the apparatus comprising as subpart an encoder or transmitter, comprising a generic variant of a data formatter 613. The skilled reader understands this can have many forms, e.g. ways to further encode or organize the image or color encoding of its pixels, e.g. apply an image/video compression to the data like e.g. HEVC, do formatting or further encoding like e.g. channel encoding depending on whether the data is saved e.g. on a data carrier, or transmitted over some data communication channel, etc. We also show as part of a receiving unit a data extractor 652, which also can be any unit or combination of units ultimately leading to the desired image information, i.e. it may physically comprise demodulating units, image/video decompression units, reformatting units, image processing units, etc.

Figure 7A:
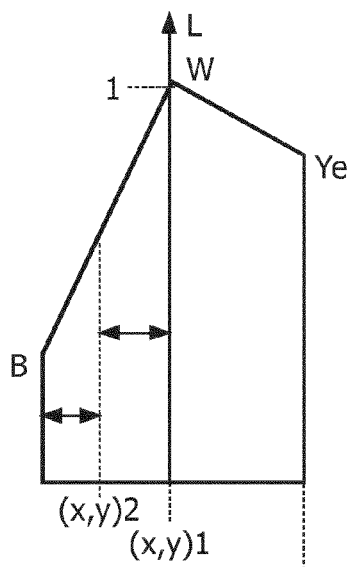
FIG. 7a shows the gamut in a cross-section (luminance, saturation)
Figure 7B:
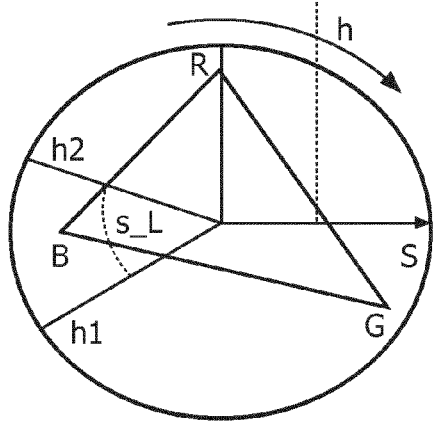
FIG. 7b shows the triangular projection of the gamut base in a (hue, saturation) color plane.
Figure 7C:
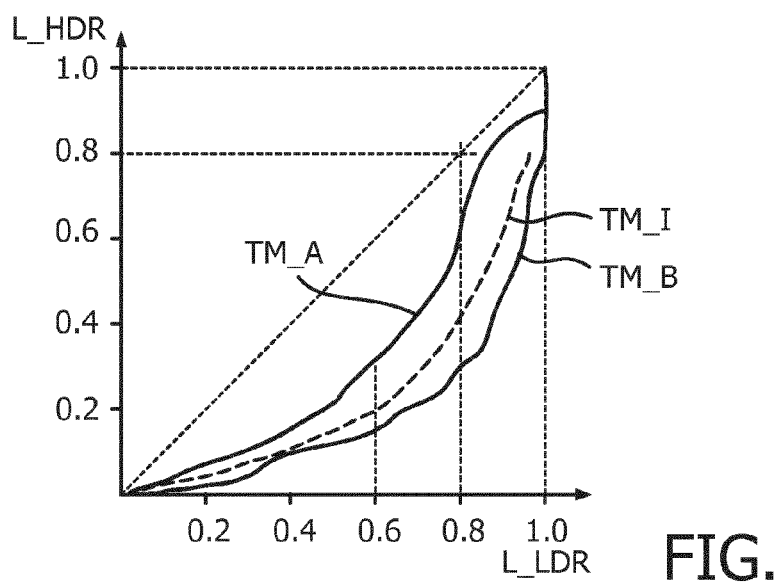
FIG. 7c shows a possible way to arrive at a set of local functions by deriving them as interpolated functions between two prespecified functions along the common luminance axis for the two-colocated gamuts (e.g. LDR to HDR), according to some interpolation strategy.

To show some other possible variations on the concept of our method, we show with FIG. 7 how it can work with multiple tone mappings for different (x,y) tuplets. In this one possible example, the grader now has designed his tone mapping curve TM_A for the near neutral (around L-axis) color region, just as in the single tone mapping curve examples above. However, for the bluish colors, he considers tone mapping TM_B to yield better colors. He can now specify this second curve e.g. for a color region between hues h [h1,h2], and corresponding to a saturation limit s_L. Starting from this human specification, the image color processing apparatus 201 can now automatically determine whatever desired tone mapping for each (x,y). E.g., it could use TM_A for all colors (x,y) outside the hue sector [h1,h2] use an interpolated tone mapping TM_I for continuity in the sector for saturations below s_L, and an extrapolation (e.g. use TM_B everywhere) in the sector above s_L (or also use a little interpolation near the borders—inside or outside—the segment with the surrounding part of the color circle, if more continuous behavior is desired. It can be understood by the skilled reader that there can be many ways to derive the interpolated function, e.g. TM_I(s)=a(s)*TM_A(s)+b(s)*TM_B(s), where the weighing factors between the output results of both functions are dependent on the saturation, so vary in some functional way in the lower saturation part of the hue sector. In any case, once having a local tone mapping TM_I or whatever, exactly the same method can be used as described above, by appropriately scaling to the locally available luminance range in the gamut so that no clipping can occur.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image color processing apparatus comprising:
   a tone mapping deformation unit arranged to determine an adjusted output luminance for the output color from an input luminance of the input color and on the basis of an input tone mapping defining output luminances as a function of input luminances, and a quantity linearly related to the input luminance, the quantity being indicative of a maximum luminance which for the chromatic coordinates of the input color is maximally achievable in at least one of a gamut corresponding to the first luminance dynamic range and a gamut corresponding to the second luminance dynamic range for those chromatic coordinates;
   wherein the image color processing apparatus is arranged to transform an input color of a pixel specified in a color representation corresponding to a first luminance dynamic range into an output color of a pixel specified in a color representation corresponding to a second luminance dynamic range, which first and second dynamic ranges differ in extent by at least a multiplicative factor of 1.5,
   wherein the tone mapping deformation unit is arranged to generate the adjusted output luminance by applying an adjusted tone mapping to the input luminance; and
   the tone mapping deformation unit is arranged to determine the adjusted tone mapping by adapting the input tone mapping dependent on the quantity so that any adjusted output luminance obtained by applying the adjusted tone mapping to any input luminance of all possible input luminances in its range of valid values 0 to 1 is not higher than a maximum luminance which for the chromatic coordinates of the input color is maximally achievable in the gamut corresponding to the second luminance dynamic range for those chromatic coordinates.

2. An image color processing apparatus as claimed in claim 1, in which the tone mapping deformation unit is further arranged to apply a monotonic transformation to the functional shape of the input tone mapping as compared to its axis, which is defined so that if the output luminances, obtained by applying the input tone mapping to two different input luminances, have a non-zero difference with a sign, then the adjusted output luminances for those input luminances also have a non-zero difference with the same sign.

3. An image color processing apparatus as claimed in claim 2, in which the tone mapping deformation unit is further arranged to apply a smooth transformation to the functional shape of the input tone mapping as compared to its axis, determined to have successive luminance differences for neighboring chromatic coordinates between the adjusted output luminance and the output luminance obtained by applying the adjusted tone mapping to the input color luminance varying smoothly.

4. An image color processing apparatus as claimed in claim 1, in which the tone mapping deformation unit is further arranged to perform the determining of the adjusted output luminance by applying an adjusted luminance as input to the input tone mapping, which adjusted luminance is derived by applying a function to the input color luminance, which function is defined based on the maximum luminance, so that an input luminance equal to this maximum luminance is mapped to the maximum possible value of the input luminance for the input tone mapping.

5. An image color processing apparatus as claimed in claim 4, wherein the function applicable to the input color luminance is a linear scaling.

6. An image color processing apparatus as claimed in claim 1 wherein the tone mapping deformation unit is arranged to generate a scaled luminance by scaling the input luminance by a first scale factor determined from the quantity; determine a scaled adjusted luminance by applying the input tone mapping to the scaled luminance; and generating the adjusted output luminance by scaling the scaled adjusted luminance by a second scale factor corresponding to the reciprocal of the first scale factor.

7. An image color processing apparatus as claimed in claim 1, wherein the tone mapping deformation unit is further arranged to use as the quantity linearly related to the luminance a maximum of a color channel component defining the input color.

8. An image color processing apparatus as claimed in claim 7 wherein the tone mapping deformation unit is arranged to generate an adjusted luminance by applying the input tone mapping to the maximum of the color channel components; and to generate the adjusted output luminance by scaling the adjusted luminance by a scale factor dependent on the input luminance and the maximum of the color channel components.

9. An image color processing apparatus as claimed in claim 7 wherein the input color is provided in a color channel representation and the apparatus further comprises a color representation converter for generating the input luminance as a luminance of a chromaticity and luminance representation of the input color by converting the color channel representation of the input color.

10. An image color processing apparatus as claimed in claim 7 further comprising an outputter arranged to generate a color channel representation output color by scaling the color channel components of the input color by a scale factor dependent on the adjusted output luminance and the input luminance.

11. An image color processing apparatus as claimed in claim 1, further comprising a tone mapping determining unit arranged to determine the input tone mapping on the basis of at least one predetermined tone mapping.

12. An image encoder comprising an image color processing apparatus as claimed in claim 1 and a data formatter for outputting at least an output image comprising pixel output colors of chromatic coordinates and adjusted output luminances.

13. An image decoder comprising an image color processing apparatus as claimed in claim 1, and comprising a data extractor arranged to obtain color data of pixels in an image.

14. An image decoder as claimed in claim 13, in which the data extractor is further arranged to obtain a tone mapping.

15. A method of image color processing comprising:
transforming an input color of a pixel specified in a color representation corresponding to a first luminance dynamic range into an output color of a pixel specified in a color representation corresponding to a second luminance dynamic range, which first and second dynamic ranges differ in extent by at least a multiplicative factor 1.5, the transforming comprising;
determining an adjusted output luminance for the output color from an input luminance of the input color and on the basis of an input tone mapping defining output luminances as a function of input luminances, and a quantity linearly related to the input luminance, the quantity being indicative of a maximum luminance which for the chromatic coordinates of the input color is maximally achievable in at least one of a gamut corresponding to the first luminance dynamic range and a gamut corresponding to the second luminance dynamic range for those chromatic coordinates;
wherein the adjusted output luminance is determined by applying an adjusted tone mapping to the input luminance; and determining the adjusted tone mapping by adapting the input tone mapping dependent on the quantity so that any adjusted output luminance obtained by applying the adjusted tone mapping to any input luminance of all possible input luminances in its range of valid values 0 to 1 is not higher than a maximum luminance which for the chromatic coordinates of the input color is maximally achievable in the gamut corresponding to the second luminance dynamic range for those chromatic coordinates.

16. A method of image color processing as claimed in claim 15, wherein the determining of the adjusted output luminance is further characterized in that it involves determining an adjusted luminance for use as input to the input tone mapping, which adjusted luminance is derived by applying a function to the input color luminance, which function is defined based on the maximum luminance, so that an input luminance equal to this maximum luminance is mapped to the maximum possible value of the input luminance for the input tone mapping.

17. A method of image color processing as claimed in claim 16, wherein the quantity linearly related to the luminance of the input color is a maximum of color channel components defining the input color.

18. A method of image color processing as claimed in claim 15, comprising determining the input tone mapping on the basis of at least one further predetermined tone mapping.

19. A computer program product comprising code enabling a processor to realize claim 15.

20. An image color processing apparatus as claimed in claim 1, wherein some or all of the apparatus is realized as hardware or as software running on a processor, or a combination of hardware and software.

* * * * *